United States Patent [19]

Thompson et al.

[11] 4,090,288
[45] May 23, 1978

[54] SOLID ELECTROLYTE CAPACITOR WITH METAL LOADED RESIN END CAPS

[75] Inventors: David Gale Thompson, Williamstown, Mass.; John Taylor Ogilvie, Bennington, Vt.

[73] Assignee: Sprague Electric Company, North Adams, Mass.

[21] Appl. No.: 666,727

[22] Filed: Mar. 15, 1976

[51] Int. Cl.² ............................................. H01G 9/00
[52] U.S. Cl. ................................... 29/570; 361/433
[58] Field of Search ............... 29/570, 589; 361/433; 427/80, 271, 277

[56] References Cited

U.S. PATENT DOCUMENTS

| 3,341,752 | 9/1967 | Fournier | 361/433 |
|---|---|---|---|
| 3,795,844 | 3/1974 | Markarian | 361/433 |
| 3,828,227 | 8/1974 | Millard et al. | 361/433 |
| 3,846,260 | 11/1974 | Bernard | 29/570 |
| 3,855,505 | 12/1974 | Karlik et al. | 29/570 |
| 3,903,589 | 9/1975 | Klein et al. | 29/570 |

Primary Examiner—Gerald A. Dost
Attorney, Agent, or Firm—Connolly and Hutz

[57] ABSTRACT

In the process for producing solid electrolyte capacitors, wherein a plurality of porous valve-metal anodes are attached by their anode lead wires to a metal carrier bar during the steps of forming the dielectric film, depositing the solid electrolyte and applying a conductive counterelectrode thereover; the capacitors may be substantially finished by further batch process steps prior to severing the anode wires and removing them from the carrier bar. An insulative resin coating is applied over each counterelectroded body and metal loaded end caps are formed over the anode end and the cathode end respectively of each body to provide terminations by which the capacitor may be flush mounted to a printed circuit board.

9 Claims, 7 Drawing Figures

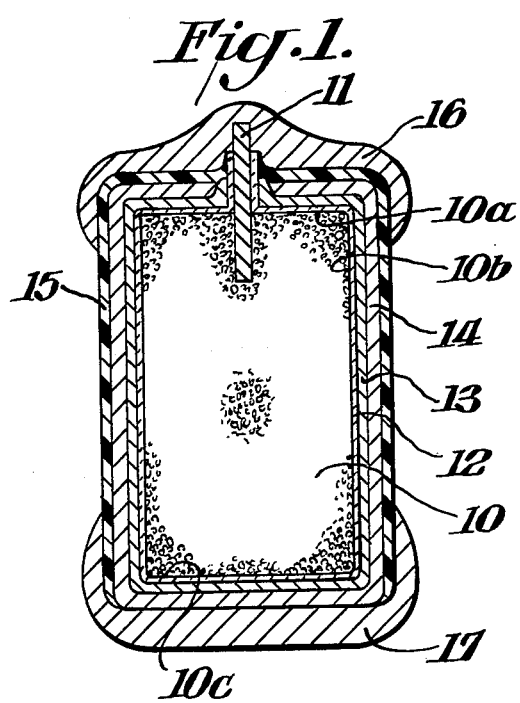
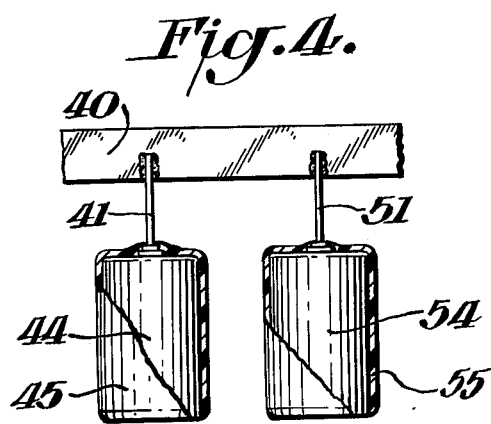
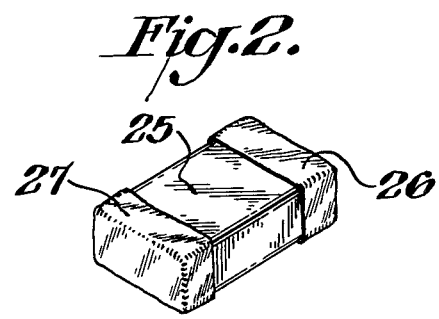
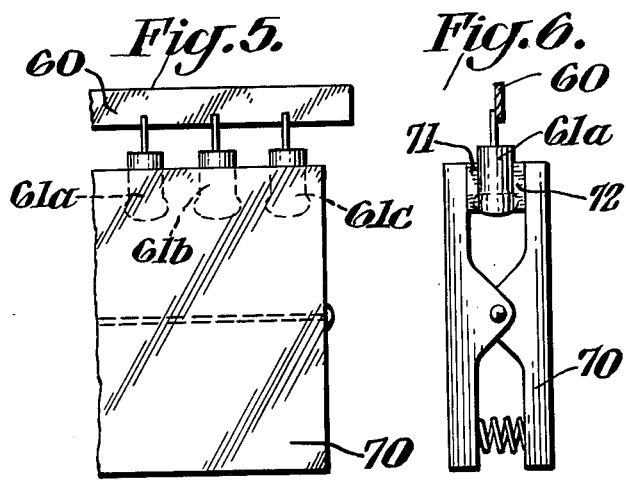
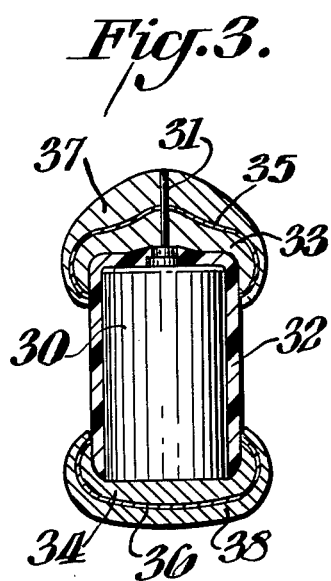
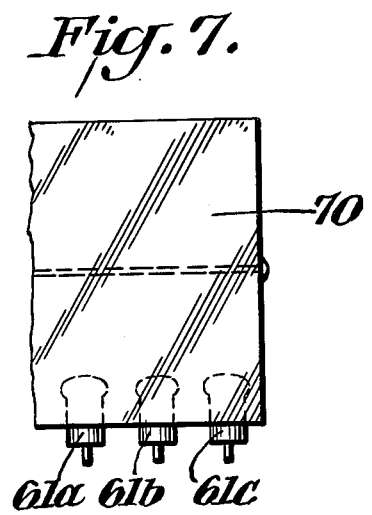

SOLID ELECTROLYTE CAPACITOR WITH METAL LOADED RESIN END CAPS

BACKGROUND OF THE INVENTION

The present invention relates to a miniaturized solid electrolyte capacitor that has integral terminals suitable for flush mounting, and more particularly to such a capacitor wherein the terminals are comprised of metal loaded resin end caps.

To make a flush mounting solid electrolyte capacitor, it is known to fit a plastic sleeve over a solid tantalum capacitor, and thereafter to fit cup shaped metal end caps to the two ends of the capacitor over the sleeve. Such a construction is described by Millard et al in U.S. Pat. No. 3,828,227, issued Aug. 6, 1974. An anode riser wire is welded to the anode end cap while the cathode end cap is connected to the counterelectrode of the body by means of a conductive epoxy. Another construction is taught by Markarian in U.S. Pat. No. 3,795,844 issued Mar. 5, 1974 wherein a solid tantalum capacitor section is inserted into an insulated metal tube. Metal terminal layers are provided over the insulation of each end of the tube. Conductive epoxy or solder plugs make the connection between the terminals and the anode and cathode, respectively. Both patents are assigned to the same assignee as the present invention. Both of these constructions offer a highly disciplined geometry and the capability for withstanding severe reflow soldering conditions. However, other capacitor applications call for even lower costs and high volume efficiency.

Another similar construction employs an insulative coating of tetrafluorethylene over the body, and sheet metal end caps are connected by means of a conductive adhesive. The anode riser wire is welded to one of the end caps. Yet another similar capacitor intended for spring clip mounting is described by Fournier in U.S. Pat. No. 3,341,752 issued Sept. 12, 1967, also assigned to the same assignee, wherein the capacitor body having a cathode and anode wire is contained within a plastic tube, the tube filled with an insulative resin and conductive coatings at each end connect to the anode and cathode wires and form clipable terminations.

The above constructions either have less than an optimum volume efficiency as measured by the volt-microfarad product per unit package volume, or require metal end caps to be fitted over the ends of the capacitor with which there are associated problems of cost and reliability. Fitted end caps of the proper size must be provided for each capacitor body size and even for one body size, dimensional control must be maintained to assure a proper fit. Also, it is desirable to eliminate all voids under the fitted end cap to avoid trapping flux or other contaminants and corrosive materials in such voids. Attempts to accomplish this by back filling the end cap with epoxy or the like are painstaking and then not always fully effective. Furthermore, the bimetallic weld between the tantalum anode riser wire and the solderable fitted end cap is subject to fracture in thermal shock or mechanical stress and is a potential source of early failure.

It is therefore an object of the present invention to provide a low cost solid electrolyte valve-metal capacitor suitable for flush mounting.

It is another object of the present invention to provide such a capacitor having high volume efficiency and high reliability.

It is a further object of this invention to provide such a capacitor that can be made by process steps of a minimum number and of a simple noncritical nature.

It is a further object of this invention to provide such a capacitor that can be made by process steps that do not tend to produce flux trapping voids and that do not include welding.

It is yet a further object of this invention to provide such capacitors that can be made by process steps most of which can be executed on a multiple basis.

SUMMARY OF THE INVENTION

A low cost miniaturized electrolyte capacitor has a porous valve-metal anode with one end face from which an anode wire of the valve-metal extends. An opposite end face is associated with a cathode connection. At least one side face is contiguous with the end faces. A conductive counterelectrode layer overlies the solid electrolyte in a region over the side face or faces and extends over the opposite end face. An insulative organic coating lies over the one end face as well as over the side portion of the counterelectrode, but extends essentially no further than just to the opposite end face portion of the counterelectrode. A conductive anode end cap is formed directly over the insulative coating at the one end face and electrically contacts the anode wire. A conductive cathode end cap is formed directly over and in contact with the opposite end face portion of the counterelectrode. These end caps consist of a conductive organic resin system containing metal particles and serve as the terminals for the capacitor. The end caps have a free-form and are essentially conformal with the anode.

In the production of capacitors of this invention, a plurality of porous tantalum anodes may be attached to a metal carrier bar by welding the end of each anode wire thereto, and all or at least most subsequent process steps are executed in batch fashion prior to cutting the anode wires and separating the finished capacitors from the bar. Alternatively, the insulative coating and the cathode end caps are formed on the capacitors while being attached to the bar. The capacitors are then held by a holding fixture, the anode wires are severed and the anode end caps are then applied by the same batch steps used to form the cathode end caps.

BRIEF DESCRIPTION OF THE DRAWINGS

FIG. 1 shows in cross sectional view a capacitor made in accordance with this invention.

FIG. 2 shows in perspective view another capacitor of this invention.

FIG. 3 shows essential features in cross section of a third capacitor of this invention.

FIG. 4 shows in partially sectioned side view, two of a plurality of capacitors of this invention at an interim point in their manufacture.

FIG. 5 shows in side view a plurality of capacitors attached by their anode wires to a carrier bar, and held by their cathode ends in a holding fixture.

FIG. 6 shows the assembly of FIG. 5 in the end view.

FIG. 7 shows the assembly of FIG. 5 inverted after the anode wires have been severed.

DESCRIPTION OF THE PREFERRED EMBODIMENT

In a preferred embodiment of the present invention as shown in FIG. 1, porous tantalum anode 10 has a tantalum riser wire 11 partially embedded therein. Alternatively, the lead wire 11 may be welded to the anode 10. A dielectric film 12 of tantalum oxide is formed over all the surfaces of the anode body 10 including those of the porous anode interstices. A solid electrolyte 13, preferably of manganese dioxide, is disposed over the surfaces of the dielectric film 12, again including such surfaces within the interstices. The electrolyte 13 and the film 12 are shown schematically as only being on the outer surfaces of the anode 10 for pictorial clarity.

A conductive counterelectrode layer 14 overlies the solid electrolyte 13, the layer 14, preferably being comprised of a first sublayer of graphite and an overlayer of metal particles in a binder. Alternatively, the overlayer may be a sprayed copper or other substantially all metal composition. The counterelectrode layer 14 will preferably extend over the anode end face 10a to help seal the easily reducible manganese dioxide 13 within, but this is not essential particularly if the counterelectrode structure is used that is described in U.S. Pat. No. 4,017,773 issued Apr. 12, 1977 which patent is assigned to the same assignee.

It is desirable that the counterelectrode 14 overlies substantially all of the side face 10b of the anode to obtain a capacitor having a minimum dissipation factor. The counterelectrode 14 must extend over the cathode end face 10c. FIG. 1 is intended to represent a cylindrical anode capacitor. Of course, if a rectangular anode is employed, most of the four side faces would preferably be covered by the counterelectrode. A completed rectangular anode capacitor is illustrated in FIG. 2 having an insulative protective coating 25 and conformal end cap terminals 26 and 27.

Returning to FIG. 1, an insulative organic coating 15 is formed over the counterelectrode layer 14 at the anode end face 10a and at substantially all of the side face 10b, while essentially not extending over the cathode end face 10c. A conductive cathode end cap 17 is formed over the cathode end face 10c and is bonded in contact with the counterelectrode 14 there. A conductive anode end cap 16 is formed over the insulative coating 15 at the anode end face 10a, where it makes electrical contact to the anode riser wire 11. The anode wire may be flattened to increase the contact area. For improved flush mounting properties, the spaced apart end caps 16 and 17 preferably extend partially over the side face portion of the insulative coating 15 as shown; although if the end caps exist only one the end faces, flush mounting can be effected by forming fillets of solder or of conductive resin between such limited end caps and adjacent printed conductors of a printed circuit board. The end caps 16 and 17 consist of metal particles in an organic resin binder. Although the free form terminations of this capacitor do not possess the disciplined geometry of the pre-formed sheet or drawn metal end cap terminations of the prior art, they are essentially conformal to the anode body and quite suitable for flush mounting by conventional methods.

The capacitor is now complete for many practical applications, particularly those in which the connection and mounting of the capacitor will be accomplished by the use of conductive pastes. However, in some applications the component will be required to be reflow solder attached to a printed circuit.

The capacitor shown in FIG. 3 represents another finished unit having been made by a substantially all batch process. The counterelectroded capacitor 30 has an anode wire 31 and an insulative coating 32. The metal particle loaded anode end cap 33 and cathode end cap 34 have on their outer surfaces highly conductive films 35 and 36, respectively, for example silver in a resin binder. Layers of solder 37 and 38 overlie the films 35 and 36, respectively. This capacitor package is suitable for direct reflow solder mounting to a printed wiring board. Of course, the solder layers 37 and 38 may be omitted when mounting or attachment is to be made by a soldering step wherein solder is applied externally. Also, when the end caps 33 and 34 themselves are solderable, it will not be necessary to include films such as 35 and 36. It will also be appreciated that in any of the above described embodiments, the length of the anode lead wire is generally of little functional significance.

It will also be appreciated that valve-metals other than tantalum may be employed. For example titanium, aluminum, zirconium and niobium may be used.

A number of experimental capacitors were made as follows. A sintered tantalum pellet with an embedded tantalum wire was anodized to form a dielectric film of $Ta_2O_5$. A conductive $MnO_2$ layer was deposited by pyrolytic decomposition of manganous nitrate. Layers of graphite and a conductive silver paint were applied by dipping and curing the silver paint to complete the counterelectrode layer. An insulative resin coating was applied by dipping the entire unit. All of the above steps were carried out, each for several capacitors simultaneously, while the capacitors were held by their respective anode wires 41 and 51 as is illustrated in FIG. 4, these wires being welded to a carrier bar 40. While still wet, the cathode end faces of the counterelectrodes 44 and 54 were blotted free of the insulative resin coatings 45 and 55. After curing the coatings 45 and 55, any oxides on the surface of the anode wires 41 and 51 may be removed by sandblasting. The anode wire was then cut, leaving a short stub portion extending beyond the insulative coating. To make the capacitor as shown in FIG. 1, it would then be appropriate to dip the ends of the individual capacitors into a metal loaded resin and cure the resin to form the end caps.

The insulative coatings 45 and 55 were applied by dipping in a silicone resin Number 240-SB as supplied by Electro-Science Labs, Pennsauken, New Jersey. The uncured coating was removed from the cathode end of the counterelectrode by means of blotting with an absorptive cloth. The cloth may contain a liquid solvent such as xylene. The coatings 45 and 55 were cured at 250° C for about thirty minutes and had a thickness of about 0.010 inch. Silicone resins are particularly useful because of their ability to withstand thermal shock and to provide strong adherence. However, other high temperature resin systems such as polyimides and fluoroplastics may be suitable, especially for capacitors as shown in FIG. 1 that are to be mounted by conductive resin bonding rather than by soldering.

The end caps 33 and 34 may be formed by dipping the ends of the capacitor in an epoxy containing silver particles, Type 5504 conductive epoxy made by duPont. Curing is accomplished at 200° C for 45 minutes. Another suitable conductive epoxy material containing copper particles is CONDUCT X-5001 supplied by Electro-Kinetic Systems, Chester, Pennsylvania. In general, silver containing resins are more solderable and are thus preferred for the direct application of solder thereto. It is also possible to apply a thin coating (e.g. 35 and 36 in FIG. 3) of highly solderable silver paste over the metal loaded epoxy and cap and curing whereafter a solder layer may be applied by hot dipping or by heat reflowing of solder preforms. Alternatively, solderability may be improved by electroplating, electroless plating, or otherwise applying a highly solderable film such as silver or solder over the end caps. When a layer of solder, e.g. of 60% tin and 40% lead, is to be applied directly over silver containing resin end caps or directly over an intermediate film of silver, it is preferred to use a silver saturated solder.

In the above described process steps, the conventional dielectric film forming, applying and pyrolytically converting manganese nitrate to $MnO_2$, and spraying or otherwise applying a counterelectrode are traditionally performed for a plurality of capacitors while attached by their anode leads to a carrier bar. However, unlike prior art methods, all subsequent steps required for making the capacitor according to this invention may be executed in a batch manner prior to cutting the anode wires and separating the finished capacitors from the bar. The steps of applying the insulative coating by dipping or spraying, blotting and curing, the steps of applying the cathode end cap by dipping and curing and steps of applying the anode end caps by needle dispensing or brushing and curing are readily accomplished in a batch manner while the capacitors are attached to the carrier bar. The optional steps of plating and solder coating are also amenable to such batch methods. Alternatively, after only the cathode terminations have been formed as described above on a plurality of capacitors 61a, 61b and 61c that are attached to a carrier bar 60 as shown in FIGS. 5 and 6, a holding fixture such as the clamp 70 may be used to hold the capacitors by the finished cathode ends. Pieces of resilient material 71 and 72 help provide uniform holding of the somewhat nonuniform cathode terminations. The anode wires may then be severed and the bar 60 discarded. The anode ends of the capacitors may now be completed by batch steps, the clamp being conveniently inverted as shown in FIG. 7 for the dipping steps.

It will be appreciated that none of these steps requires critical process control measures and that such batch process steps contribute importantly to low costs. It has been estimated that capacitors made in accordance with this invention can be produced at about half the cost of producing comparable capacitors of heretofore known structures.

What is claimed is:

1. A method for making a low cost miniaturized electrolytic capacitor including providing a porous valve-metal anode with one end face from which a wire of said valve-metal extends, an opposite end face and at least one side face continguous with said two end faces; forming a dielectric film over the surfaces of said porous anode; disposing a solid electrolyte over said dielectric film; and depositing a conductive counterelectrode layer overlying said solid electrolyte in a region over said at least one side face and extending over said opposite end face; wherein the improvement comprises:
    (a) dipping said counterelectroded anode in an insulative liquid resin to form a coating of said resin over said side face and said two end faces;
    (b) blotting said opposite end face to remove said resin coating therefrom;
    (c) curing said resin
    (d) forming a free-form conductive anode end cap of an organic resin containing metal particles directly over said insulative coating at said one end face making electrical contact with said anode wire; and
    (e) forming a free-form conductive cathode end cap of an organic resin containing metal particles directly over and in contact with said opposite end face portion of said counterelectrode so that said conductive anode and cathode end caps are spaced from each other.

2. The method of claim 1 additionally comprising attaching to a metal carrier bar a plurality of said counterelectroded capacitors by means of welding the ends of said valve-metal anode wires to said carrier bar wherein said capacitors are held by said bar during said dipping and said blotting steps which steps are accomplished by dipping simultaneously and blotting simultaneously, respectively, said plurality of capacitors.

3. The method of claim 1 additionally comprising attaching to a metal carrier bar a plurality of said counterelectroded capacitors by means of welding the ends of said valve-metal anode wires to said carrier bar wherein said forming said cathode end caps is followed by the additional steps of holding the cathode ends of said capacitor in a holding fixture and severing said anode lead wires, whereafter said forming of said anode end caps is accomplished.

4. The method of claim 1 wherein said forming of said anode and said cathode free-form end caps is accomplished by dipping the anode and the cathode end faces, respectively, into said organic resin being in an uncured liquid state, and curing said resin.

5. The method of claim 1 wherein said insulative coating is a silicone resin.

6. The method of claim 1 additionally comprising applying a silver paste over said end caps and curing said paste to provide a highly solderable film.

7. The method of claim 6 additionally comprising depositing layers of solder over said end caps, respectively.

8. The method of claim 1 additionally comprising silver plating said end caps.

9. The method of claim 1 wherein said valve-metal is tantalum.

* * * * *